US011992170B2

(12) United States Patent
Thackery et al.

(10) Patent No.: US 11,992,170 B2
(45) Date of Patent: May 28, 2024

(54) WEARABLE VACUUM CLEANER

(71) Applicant: TECHTRONIC CORDLESS GP, Anderson, SC (US)

(72) Inventors: Clinton C. Thackery, Clemson, SC (US); Jacob F. Creasman, Anderson, SC (US)

(73) Assignee: Techtronic Cordless GP, Anderson, SC (US)

( * ) Notice: Subject to any disclaimer, the term of this patent is extended or adjusted under 35 U.S.C. 154(b) by 38 days.

(21) Appl. No.: 17/852,210

(22) Filed: Jun. 28, 2022

(65) Prior Publication Data

US 2022/0408989 A1  Dec. 29, 2022

Related U.S. Application Data

(60) Provisional application No. 63/216,095, filed on Jun. 29, 2021.

(51) Int. Cl.
*A47L 5/36* (2006.01)
*A47L 9/14* (2006.01)
(Continued)

(52) U.S. Cl.
CPC .............. *A47L 5/365* (2013.01); *A47L 9/14* (2013.01); *A47L 9/1608* (2013.01);
(Continued)

(58) Field of Classification Search
CPC ... A47L 5/36; A47L 5/365; A47L 9/14; A47L 9/1608; A47L 9/2884; A47L 9/1658; A47L 9/1691
(Continued)

(56) References Cited

U.S. PATENT DOCUMENTS

D326,747 S     6/1992  Stickle
5,267,371 A *  12/1993  Soler ............... A47L 9/1633
                                                    15/327.5
(Continued)

FOREIGN PATENT DOCUMENTS

CN   202761192 U    3/2013
CN   207285995 U    5/2018
(Continued)

OTHER PUBLICATIONS

Extended European Search Report for Application No. 22181405.6 dated Jul. 12, 2023 (9 pages).

*Primary Examiner* — Brian D Keller
*Assistant Examiner* — Tim Brady
(74) *Attorney, Agent, or Firm* — Michael Best & Friedrich LLP

(57) ABSTRACT

A wearable vacuum cleaner includes a harness configured to support the wearable vacuum cleaner on a user's back, a housing connected to the harness, a suction motor assembly disposed within the housing and operable to create a working airflow, and a collection bin configured to receive debris separated from the working airflow. The collection bin includes an opening adjacent a bottom portion of the collection bin and a lid moveably coupled to the collection bin to selectively cover the opening in a closed position and uncover the opening in an open position. The lid is movable to the open position to empty the contents of the collection bin through the opening while the collection bin remains attached to the housing.

20 Claims, 7 Drawing Sheets

(51) Int. Cl.
*A47L 9/16* (2006.01)
*A47L 9/28* (2006.01)
*A47L 9/32* (2006.01)
*H01M 50/247* (2021.01)

(52) U.S. Cl.
CPC .............. *A47L 9/2884* (2013.01); *A47L 9/32* (2013.01); *H01M 50/247* (2021.01); *A47L 9/1658* (2013.01); *H01M 2220/30* (2013.01)

(58) Field of Classification Search
USPC ........................................ 15/323, 352, 246.4
See application file for complete search history.

(56) References Cited

U.S. PATENT DOCUMENTS

| | | | |
|---|---|---|---|
| 5,588,177 A * | 12/1996 | Eriksen | A47L 5/36 15/327.5 |
| 6,066,211 A | 5/2000 | Sandell | |
| RE37,081 E | 3/2001 | Eriksen | |
| 6,267,683 B1 | 7/2001 | Jacob | |
| 6,305,048 B1 | 10/2001 | Salisian | |
| 6,550,998 B1 | 4/2003 | Fernschild et al. | |
| 6,553,610 B1 | 4/2003 | Shideler | |
| 6,568,026 B2 | 5/2003 | Roy et al. | |
| 6,695,516 B2 | 2/2004 | Defields et al. | |
| 6,799,916 B2 | 10/2004 | Fernschild et al. | |
| 6,951,430 B2 | 10/2005 | Fernschild et al. | |
| 6,955,490 B2 | 10/2005 | Chase et al. | |
| 7,063,474 B2 | 6/2006 | Defields et al. | |
| 7,232,272 B2 | 6/2007 | Balz et al. | |
| 7,341,389 B2 | 3/2008 | Chase et al. | |
| 7,509,706 B2 | 3/2009 | Clarke | |
| 7,621,686 B2 | 11/2009 | Fernschild et al. | |
| 7,670,073 B2 | 3/2010 | Fernschild et al. | |
| 7,794,165 B2 | 9/2010 | Balz et al. | |
| 9,277,844 B1 * | 3/2016 | Millan | A47L 9/244 |
| 9,456,722 B2 | 10/2016 | Tomasiak et al. | |
| 9,675,219 B1 | 6/2017 | Chaffin | |
| 9,861,242 B2 | 1/2018 | Tomasiak et al. | |
| 10,342,401 B2 | 7/2019 | Manion et al. | |
| 10,383,493 B2 | 8/2019 | Tahara | |
| 2003/0102346 A1 | 6/2003 | Chen | |
| 2006/0005346 A1 * | 1/2006 | Rupp | A47L 5/36 15/327.5 |
| 2007/0209140 A1 | 9/2007 | Clarke | |
| 2007/0237568 A1 | 10/2007 | Balz et al. | |
| 2007/0292749 A1 * | 12/2007 | Coombs | H01M 50/209 429/96 |
| 2016/0293912 A1 * | 10/2016 | Manion | B25F 5/02 |
| 2017/0007085 A1 * | 1/2017 | Tahara | A47L 9/24 |
| 2017/0035261 A1 * | 2/2017 | Lauer | A47L 5/24 |
| 2017/0238773 A1 * | 8/2017 | Chaffin | A47L 9/1683 |
| 2018/0035615 A1 | 2/2018 | Streetman | |
| 2019/0059667 A1 * | 2/2019 | Manion | A47L 9/2884 |
| 2019/0110650 A1 * | 4/2019 | Mobarak | A47L 5/225 |
| 2019/0298122 A1 * | 10/2019 | Tahara | A47L 7/0095 |
| 2019/0313864 A1 * | 10/2019 | Tahara | A47L 9/24 |
| 2020/0397200 A1 * | 12/2020 | McRorie | A47L 9/1683 |
| 2022/0125254 A1 | 4/2022 | Bloom | |

FOREIGN PATENT DOCUMENTS

| | | |
|---|---|---|
| JP | 2002320579 A | 11/2002 |
| WO | 2016085540 A1 | 6/2016 |
| WO | 2017194140 A1 | 11/2017 |
| WO | 2018007111 A1 | 1/2018 |

* cited by examiner

WEARABLE VACUUM CLEANER

CROSS-REFERENCE TO RELATED APPLICATIONS

This application claims priority to U.S. Provisional Patent Application No. 63/216,095, filed Jun. 29, 2021, the entire contents of which are incorporated herein by reference.

BACKGROUND

The present disclosure relates to wearable suction devices, and more particularly, to a backpack vacuum cleaner.

SUMMARY

In one embodiment, the disclosure provides a wearable vacuum cleaner including a harness configured to support the wearable vacuum cleaner on a user's back, a housing connected to the harness, the housing defining a working airflow path from a dirty air inlet and an exhaust outlet, a suction motor assembly disposed within the housing and operable to create a working airflow through the working airflow path, and a collection bin disposed within the working airflow path and configured to receive debris separated from the working airflow, the collection bin including an opening adjacent a bottom portion of the collection bin, and a lid moveably coupled to the collection bin to selectively cover the opening in a closed position and uncover the opening in an open position, wherein the lid is movable to the open position to empty the contents of the collection bin through the opening while the collection bin remains attached to the housing.

Another embodiment provides a wearable vacuum cleaner including a harness configured to support the wearable vacuum cleaner on a user's back, a housing connected to the harness, the housing defining a working airflow path from a dirty air inlet and an exhaust outlet, a suction motor assembly operable to create a working airflow through the working airflow path, a battery receptacle supported by the housing, the battery receptacle configured to receive a rechargeable battery for powering the suction motor, and a collection bin disposed within the working airflow path and configured to receive debris separated from the working airflow, the collection bin including an opening adjacent a bottom portion of the collection bin, and a lid moveably coupled to the collection bin to selectively cover the opening in a closed position and uncover the opening in an open position, wherein the battery receptacle is not positioned vertically below the lid when the collection bin is coupled to the housing.

In yet another embodiment, the disclosure provides a wearable vacuum cleaner including a harness configured to support the wearable vacuum cleaner on a user's back, a housing connected to the harness, a suction motor assembly operable to generate a working airflow, a collection bin removably coupled to the housing and including a cyclone arrangement configured to separate debris from the working airflow, a chamber configured to receive the debris separated from the working airflow, and a lid adjacent a bottom portion of the housing, the lid being moveable to selectively open and close the chamber, the chamber capable of being emptied while opened and while the collection bin is coupled to or removed from the housing. The wearable vacuum cleaner further including a first latch operably connected to the collection bin and configured to secure the collection bin to the housing, a second latch operably connected to the lid and configured to retain the lid in a closed position, in which the chamber is closed, the first latch and the second latch each being accessible by the user while the wearable vacuum cleaner is worn on the user's back and the collection bin is coupled to the housing, and a battery receptacle configured to receive a rechargeable battery.

Other features and aspects of the disclosure will become apparent by consideration of the detailed description and accompanying drawings.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting.

Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

DETAILED DESCRIPTION

Figure 1:
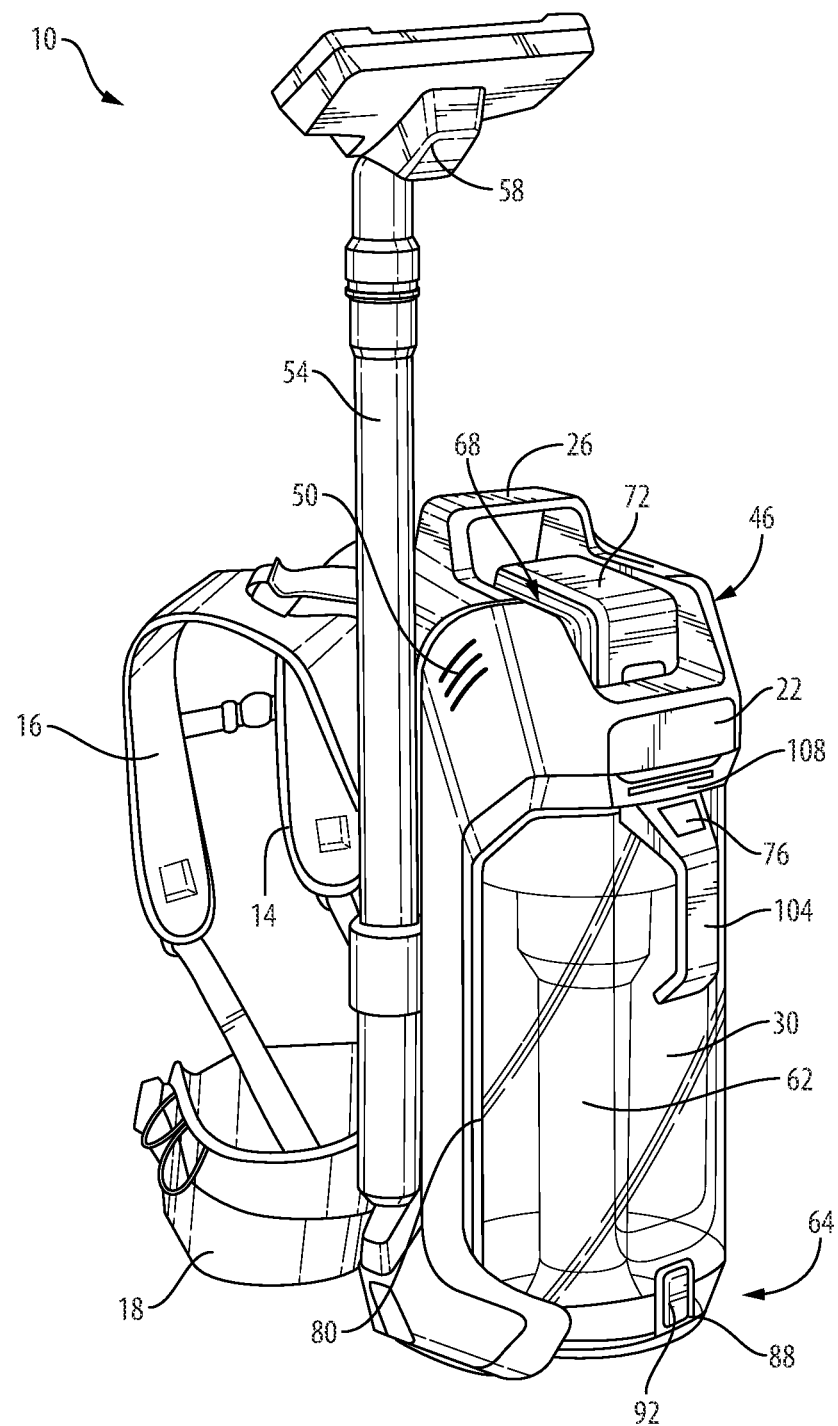
FIG. 1 is a perspective view of a wearable vacuum cleaner, according to an embodiment of the present disclosure.

FIG. 1 illustrates a portable and wearable suction unit, embodied as a vacuum cleaner 10, that can be worn by a user. In the illustrated embodiment, the vacuum cleaner 10 may be considered as a bagless and/or cyclonic backpack vacuum cleaner, a wearable vacuum cleaner, and/or the like. In particular, the vacuum cleaner 10 includes a harness 14 that is configured to support the vacuum cleaner 10 on a user's back. In some embodiments, the harness 14 includes a pair of shoulder straps 16 and a waist strap 18. In other embodiments, the harness 14 may be configured with greater or fewer straps, tethers, supports, and/or the like.

The vacuum cleaner 10 further includes main housing 22, a handle, such as a top mounted handle 26, and a collection bin 30 configured to receive dirt and/or debris. A suction motor assembly (not shown) having a suction motor (e.g., electric motor) and an impeller may be disposed within the main housing 22. The suction motor assembly is operable to generate a working airflow along a working airflow path defined in the main housing 22 between an inlet 46 and an exhaust outlet 50. Generally, the suction motor rotates the impeller to draw dirty air (e.g., laden with dust and/or debris) through the inlet 46 and into the collection bin 30. In one instance, the inlet 46 supports a suction hose (not shown) that can couple with an extension pipe 54 and a nozzle 58. In operation, dirty air may be drawn into the collection bin 30 through the inlet 46 via the suction hose, the extension pipe 54, and/or the nozzle 58.

To use the vacuum cleaner 10, the user may grab the top mounted handle 26 and/or the harness 14 to raise the vacuum cleaner 10 up to the user's shoulders. The user may then utilize the shoulder straps 16 and/or the waist straps 18 to secure the vacuum cleaner 10 onto the user's back. The nozzle 58 and the extension pipe 54 may be removably coupled to a side of the main housing 22 for storage.

Referring still to FIG. 1, the collection bin 30 is disposed within the working airflow path, such that the collection bin 30 is configured to receive debris separated from the working airflow by cyclonic action (e.g., via one or more cyclonic separation stages) and/or by a filter. In the illustrated embodiment, the collection bin 30 includes a bagless dirt cup, such as a cyclonic separator 62 having a cyclone arrangement, that is arranged to separate the debris from the working airflow.

In the illustrated embodiment, the separated dirt is collected at a bottom portion 64 of the collection bin 30, resulting in remaining filtered air flowing into the main housing 22. The filtered air is then drawn by the impeller from the collection bin 30 and through the suction motor assembly to be discharged through the exhaust outlet 50 in the main housing 22. The vacuum cleaner 10 further includes a battery receptacle 68 supported by the main housing 22 and configured to receive a rechargeable battery, such as a battery pack 72 (e.g., removable power tool battery pack) for powering the suction motor. Stated another way, the battery pack 72 may be removably coupled to the battery receptacle 68 disposed on the main housing 22.

The battery pack 72 may be a power tool battery pack generally used to power a power tool, such as an electric drill, an electric saw, a vacuum unit, and/or the like (e.g., an 18-volt rechargeable battery pack). The battery pack 72 may include lithium ion (Li-ion) cells. In alternate embodiments, the battery pack 72 may be of a different chemistry (e.g., nickel-cadmium (NiCa or NiCad), nickel-hydride, and/or the like). In the illustrated embodiment, the battery pack 72 may be an 18-volt battery pack. In some embodiments or constructions, the capacity of the battery pack 72 may vary (e.g., may be a 4-volt battery pack, a 28-volt battery pack, a 40-volt battery pack, or a battery pack of any other voltage). The battery pack 72 may further include an indicator to display the current state of charge of the battery pack 72 and/or other characteristics of the battery pack 72.

In the illustrated embodiment, the battery receptacle 68 is positioned on an upper portion of the main housing 22 adjacent the top mounted handle 26, and the battery pack 72 may be received in the battery receptacle 68 to power the suction motor and other electrical components (e.g., lights, accessories, controls, etc.) of the vacuum cleaner 10. As further shown in FIGS. 1-3, the battery pack 72 and the battery receptacle 68 are located lower than the height of the top mounted handle 26 and above the collection bin 30. Similarly, the top mounted handle 26 maybe be disposed above both the collection bin 30 and the battery receptacle 68. When the user wears the vacuum cleaner 10, in some embodiments, the battery pack 72 may be located slightly below/lower than shoulders of the user, such that the battery pack 72 can be removed from the battery receptacle 68 while the user is wearing the vacuum cleaner 10. In the illustrated embodiment, the battery receptacle 68 is not positioned vertically below the lid 84 when the collection bin 30 is coupled to the main housing 22.

Figure 2:
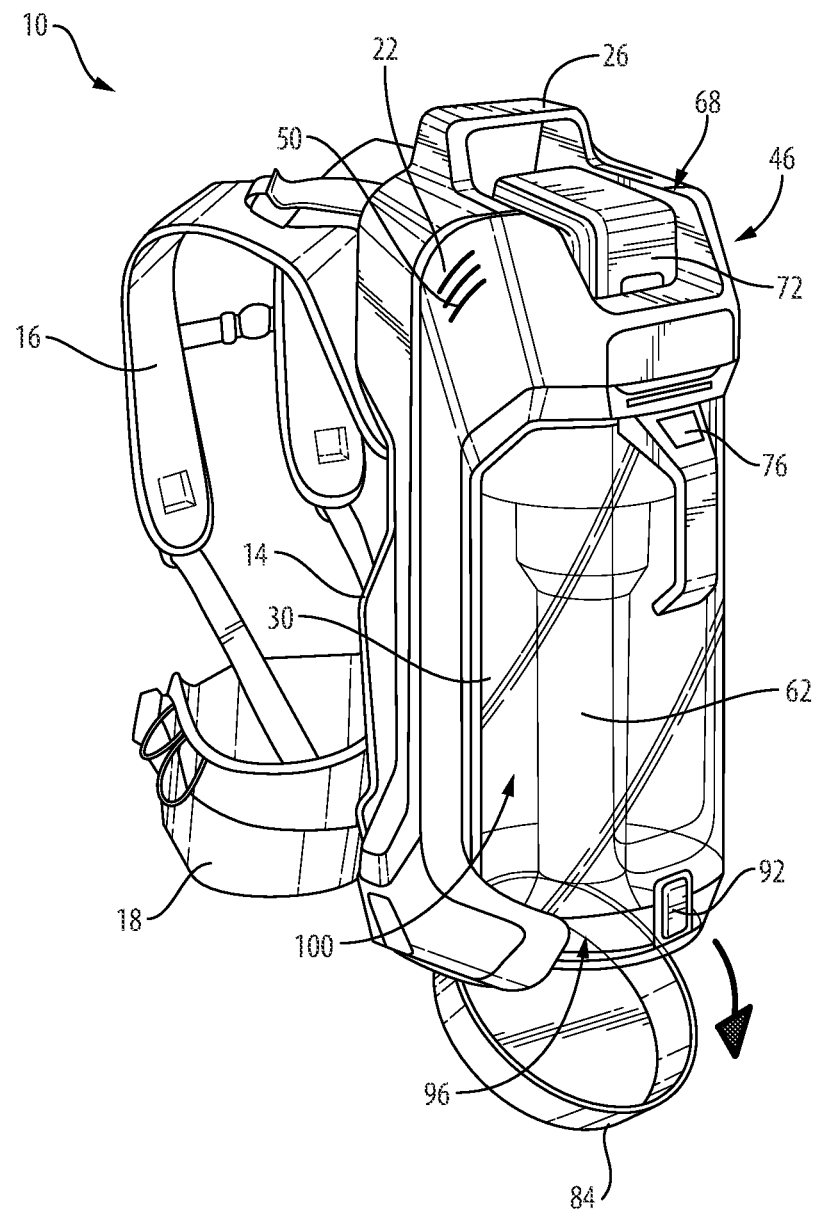
FIG. 2 is another perspective view of the wearable vacuum cleaner of FIG. 1, illustrating a collection bin lid in an open position.
Figure 3:
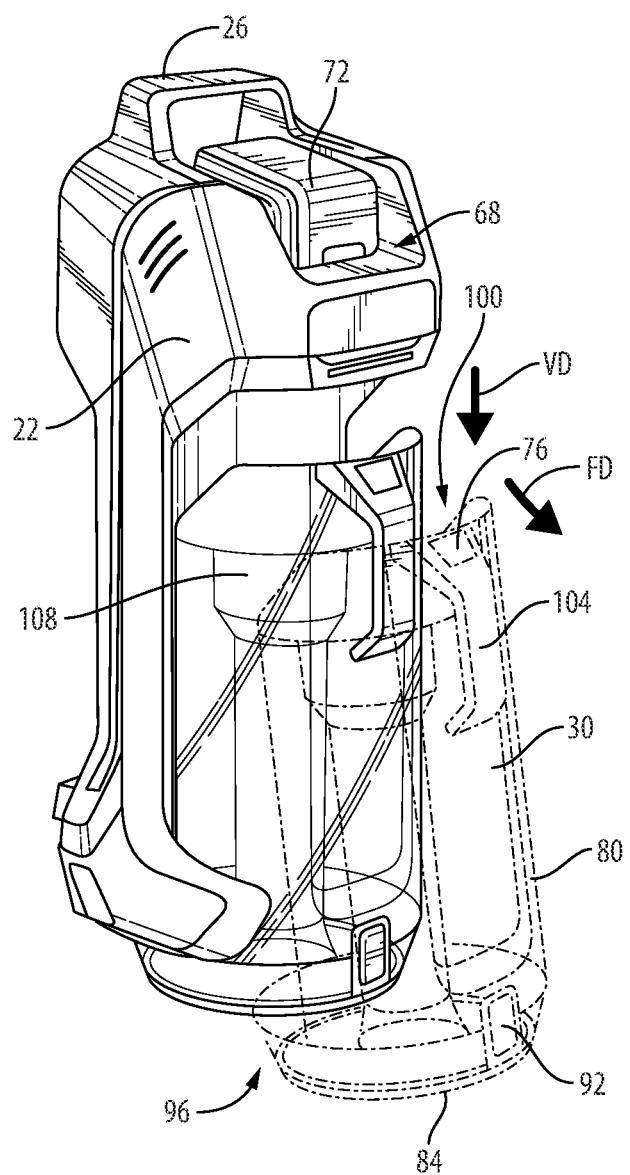
FIG. 3 is another perspective view of the wearable vacuum cleaner of FIG. 1, illustrating a collection bin being removed from the remaining wearable vacuum cleaner.

Referring now to FIGS. 2 and 3, the collection bin 30 is removable from the main housing 22 and lockable onto the main housing 22 via one or more latches, such as a first latch 76. In other words, the first latch 76 may be operably connected to the collection bin 30 to selectively secure the collection bin 30 to the main housing 22. As specifically represented in FIG. 2, an emptying operation of collected dust and debris from the collection bin 30 may be done while the collection bin 30 remains attached to the main housing 22. The collection bin 30 may also be emptied, as represented in FIG. 3, by fully removing the collection bin 30 from the main housing 22.

With continued reference to FIGS. 2 and 3, the collection bin 30 includes a generally cylindrical sidewall 80 and a moveable cover, such as the lid 84, disposed at a bottom end 88 of the cylindrical sidewall 80, which is positioned adjacent the bottom portion 64 of the collection bin 30. A bottom latch, such as a second latch 92, is operable to secure the lid 84 to the cylindrical sidewall 80 and cover an opening 96 to a chamber 100 of collection bin 30 defined by the cylindrical sidewall 80. The collection bin 30 further includes a front handle 104 suitable for carrying the collection bin 30 when removed from the main housing 22.

With specific reference to FIG. 2, the lid 84 is pivotably connected to the collection bin 30 adjacent a lower back of the user (e.g., the bottom end 88), while the top mounted handle 26 is formed on the main housing 22 adjacent an upper back or shoulder region of the user (e.g., a top end 108 of the collection bin 30). Stated another way, the battery pack 72 and the lid 84 are positioned at opposite ends of the vacuum cleaner 10. Specifically, in the illustrated embodiment, the battery receptacle 68 is at least vertically offset relative to the lid 84 and is disposed above the collection bin 30 and above the suction motor. In other embodiments, the battery receptacle 68 is horizontally offset relative to the lid 84 or both vertically and horizontally offset relative to the lid 84.

As best illustrated in FIG. 2, the opening 96 is also adjacent the bottom end 88 of the collection bin 30, and the lid 84 is moveably coupled to the collection bin 30 to selectively cover the opening 96 in a closed position (FIG. 1) and uncover the opening 96 in an open position (FIG. 2). The collection bin 30 may be arranged on the main housing 22 so the lid 84 can be moved to the open position to empty contents of the collection bin 30 (e.g., held in the chamber 100) through the opening 96 while the collection bin 30 remains attached to the main housing 22. In other words, the battery receptacle 68 is offset relative to the lid 84, such that the lid 84 is moveable to the closed position and to the open position without moving the battery receptacle 68 relative to the collection bin 30.

The lid 84 may be rotated, in some embodiments, toward the user's back. Accordingly, the second latch 92 may be located centrally on the bottom end 88 of the collection bin 30 to lock the lid 84 in place (e.g., when disposal of debris is complete, for operation, etc.). In other embodiments, the lid 84 is rotated and/or pivoted in another direction (e.g., side-to-side, helically, etc.) To begin a first example debris emptying process, the user may press/operate the second latch 92 to release a portion of the lid 84 from the collection bin 30. Once released, gravity acts on the lid 84 to pivot the lid 84 toward the open position and toward the user's back. While in the open position, gravity acts on the lid 84 and debris collected in the chamber 100, such that the lid 84 falls open and debris falls out of the opening 96. After debris disposal, the user rotates the lid 84 back toward the bottom end 88 of the collection bin 30 (e.g., pushes upward) to the closed position and locks the lid 84 in place with the second latch 92.

As detailed above, the first latch 76 may be operably connected to the collection bin 30 to selectively secure the collection bin 30 to the main housing 22, and the second latch 92 may be operably connected to the lid 84 to selectively retain the lid 84 in the closed position (FIG. 1), in which the chamber 100 is closed. Advantageously, both the first latch 76 and the second latch 92 may be accessible by the user. In some embodiments, the first latch 76 and the second latch 92 may be accessible by the user while the vacuum cleaner 10 is worn on the user's back and the collection bin 30 is coupled to the main housing 22. Similarly, the battery receptacle 68 may be supported by the main housing 22 independently of the collection bin 30, such that operation of the first latch 76, the second latch 92, or both the first latch 76 and the second latch 92 does not alter a position of the battery receptacle 68 relative to the main housing 22.

Referring now to FIG. 3, removal of the collection bin 30 from the main housing 22 is represented in more detail. To begin the collection bin 30 removal process, the first latch 76, which may be located on the front handle 104, may be operated (e.g., depressed, slid, rotated, etc.) to release the collection bin 30 from the main housing 22. Next, the user may grip/grasp the front handle 104 and slide the collection bin 30 vertically downward along a vertical direction VD and away from the main housing 22 principally along a first forward direction FD. Now, the collection bin 30 can be replaced, cleaned, emptied, and/or the like. To reattach the collection bin 30, the user may again grip/grasp the front handle 104 and slide the collection bin 30 rearwardly into the main housing 22. The collection bin 30 may then be pushed upwardly into the main housing 22, and the first latch 76 may be operated to securely lock the collection bin 30 in place in the vacuum cleaner 10. In other embodiments, the collection bin 30 may be removable from/replaceable into the main housing 22 along a purely vertical or purely horizontal direction.

With continued reference to FIG. 3, the battery receptacle 68 on the main housing 22 is configured to receive the battery pack 72 along the first forward direction FD. In other words, the battery receptacle 68 is configured to receive the battery pack 72 being inserted into the battery receptacle 68 along a direction complementary (e.g., orthogonal to, aligned with, parallel to, etc.) to the first forward direction FD. In other embodiments, the battery receptacle 68 is configured to receive a plurality of battery packs 72. In general, the battery receptacle 68 may be supported by the main housing 22 and not the collection bin 30, such that the collection bin 30 can be emptied without moving the battery receptacle 68 relative to collection bin 30 and without removing the collection bin 30 from the main housing 22.

FIGS. 4-7 illustrate a portable and wearable suction unit, such as a vacuum cleaner 210 that can be worn by a user, according to another embodiment of the present disclosure. Similar aspects between the vacuum cleaner 10 of FIGS. 1-3 and the vacuum cleaner 210 of FIGS. 4-7 are identified with common reference numbers plus "200." For example, the vacuum cleaner 210 may include a harness 214 having shoulder straps 216, a main housing 222, a top mounted handle 226, a collection bin 230, a suction motor assembly 234 having a suction motor 238 and an impeller 242, an inlet 246, an exhaust outlet 250, an extension pipe (not shown), a nozzle (not shown), a cyclonic separator (not shown), a bottom portion 264, a battery receptacle 268, a battery pack 72, a first latch 276 (FIG. 6), a second latch 292 (FIG. 6), an opening 296 (FIG. 7), a chamber 300 (FIG. 7), a front handle 304 (FIG. 6), and a top end 308. Some differences between the vacuum cleaner 10 of FIGS. 1-3 and the vacuum cleaner 210 of FIGS. 4-7 are discussed below.

Figure 4:
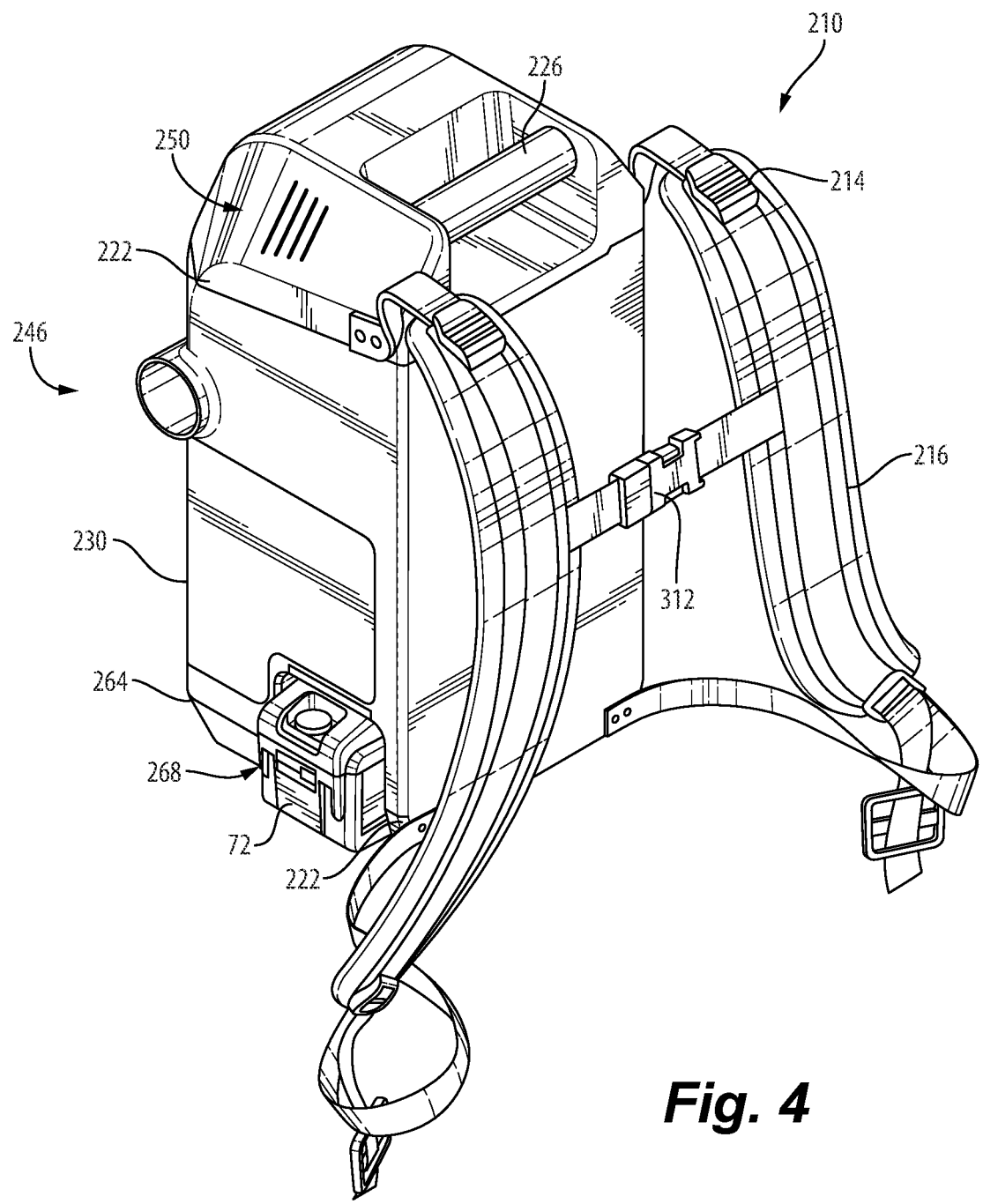
FIG. 4 is a perspective view of a wearable vacuum cleaner, according to another embodiment of the present disclosure.
Figure 5:
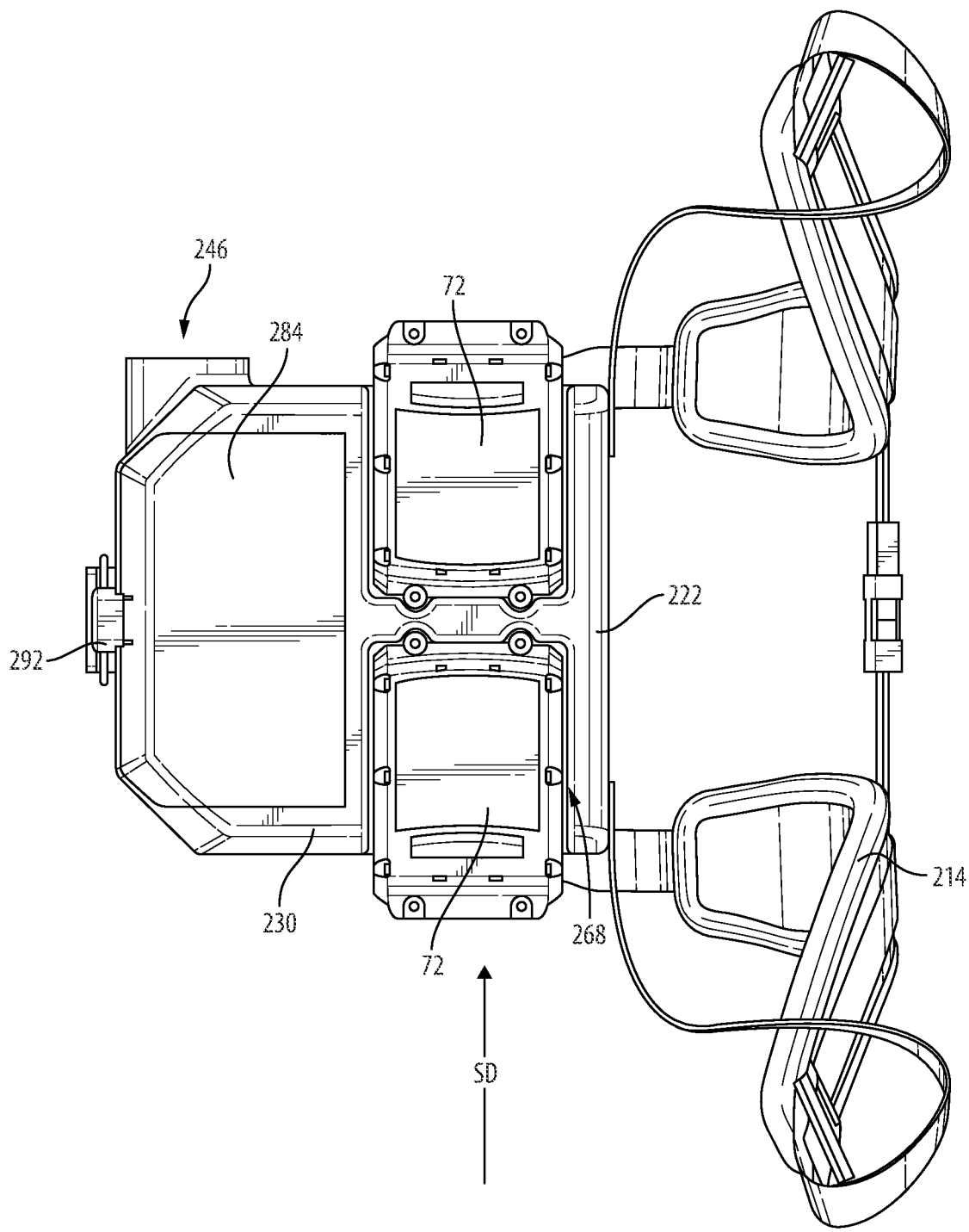
FIG. 5 is bottom perspective view of the wearable vacuum cleaner of FIG. 4.

Referring to FIGS. 4 and 5, the harness 214 may have a waist straps and may alternately/additionally include a chest strap 312 selectively connecting the shoulder straps 216. It should be stated that the harness 214 is adjustable to alter multiple segments of the harness 214 based on a desired fit of the user.

With continued reference to FIGS. 4 and 5, the battery receptacle 268 may be disposed on the main housing 222 adjacent the lid 284 and opening 296 of the collection bin 230 (e.g., adjacent the bottom end 288 of the collection bin 230). The top mounted handle 226 may be formed on the main housing 222 adjacent an upper back or shoulder region of the user (e.g., adjacent the top end 308 of the collection bin 230). Stated another way, the battery pack 272 and the lid 284 may be positioned at a common end of the vacuum cleaner 210. Specifically, in the illustrated embodiment, the battery receptacle 268 is disposed below at least a portion of the collection bin 230 and below the suction motor 238, such that at least some of the battery pack 272 in the battery receptacle 268 is vertically and horizontally offset relative to the lid 284. For example, the battery receptacle 268 is disposed nearer than the lid 284 to the user's back while the vacuum cleaner 210 is being worn by the user. The lid 284 may also be vertically offset from the battery receptacle 268. However, operation of the lid 284 is generally unaffected/uninhibited by the battery receptacle 268 because of the lateral/horizontal offset between the battery receptacle 268 and the lid 284.

With specific reference to FIG. 5, the battery receptacle 268 on the main housing 222 is configured to receive two of the battery packs 272 along a side-to-side direction of the vacuum cleaner 210. In other words, the battery receptacle 268 is configured to receive the battery packs 272 being inserted into the battery receptacle 268 along a second direction SD that is transverse to (e.g., crosses) the first forward direction FD. Each of the battery pack 272 may be inserted into the battery receptacle 268 in opposing directions (e.g., towards one another). Stated another way, one of the battery packs 272 may be inserted into the battery receptacle 268 along the second direction SD while another one of the battery packs 272 may be inserted into the battery receptacle 268 in a direction generally opposite of the second direction SD. In some embodiments, multiple battery packs may be disposed at different locations relative to one another.

In other embodiments, the battery receptacle 268 is configured to receive a plurality of battery packs 72. In general, the battery receptacle 268 may be supported by the main housing 222 and not the collection bin 230, such that the collection bin 230 can be emptied without moving the battery receptacle 268 relative to collection bin 230 and without removing the collection bin 230 from the main housing 222.

Figure 6:
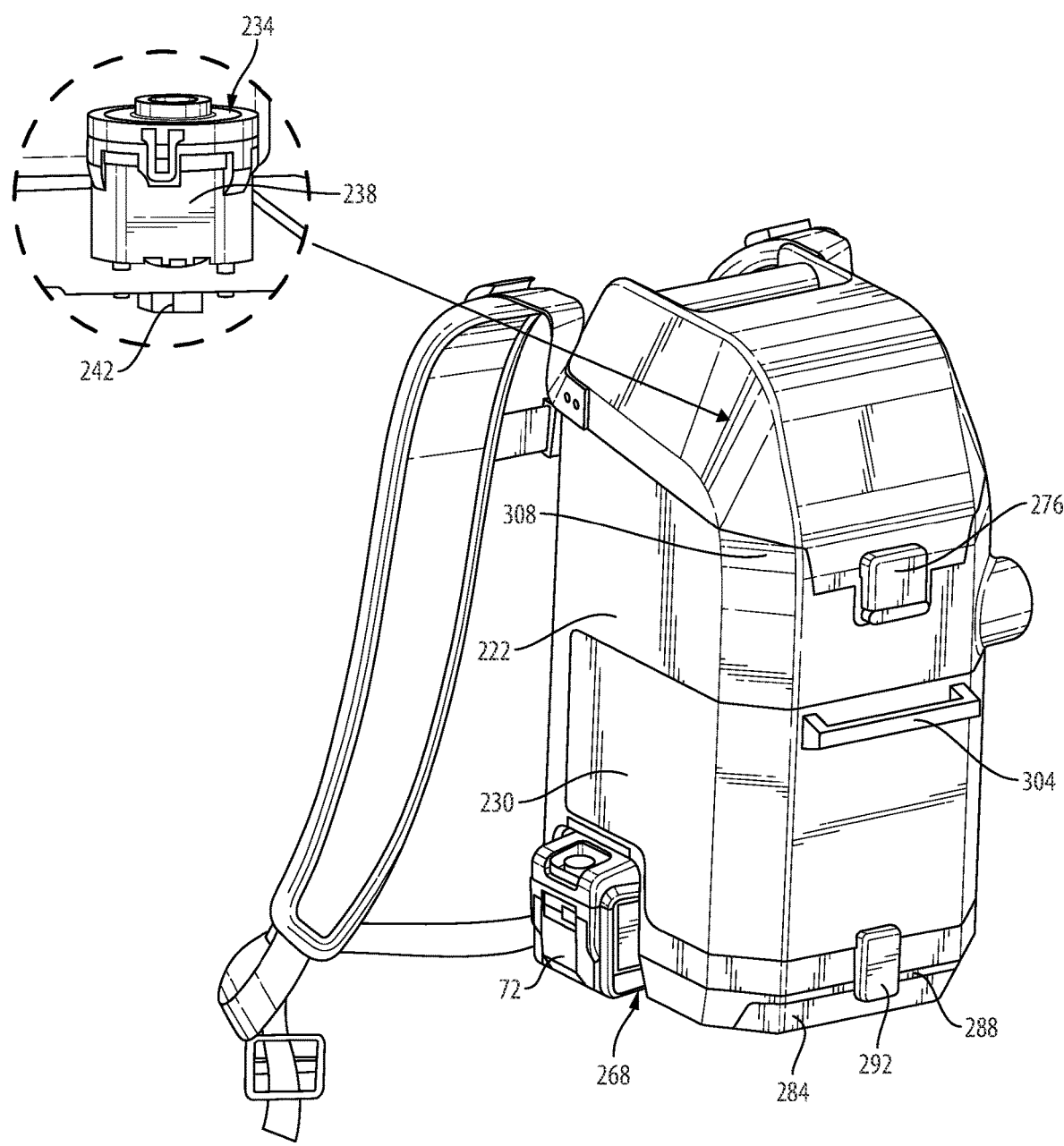
FIG. 6 is another perspective view of the wearable vacuum cleaner of FIG. 4, with a portion of the wearable vacuum cleaner removed to illustrate a suction motor housed within the wearable vacuum cleaner.
Figure 7:
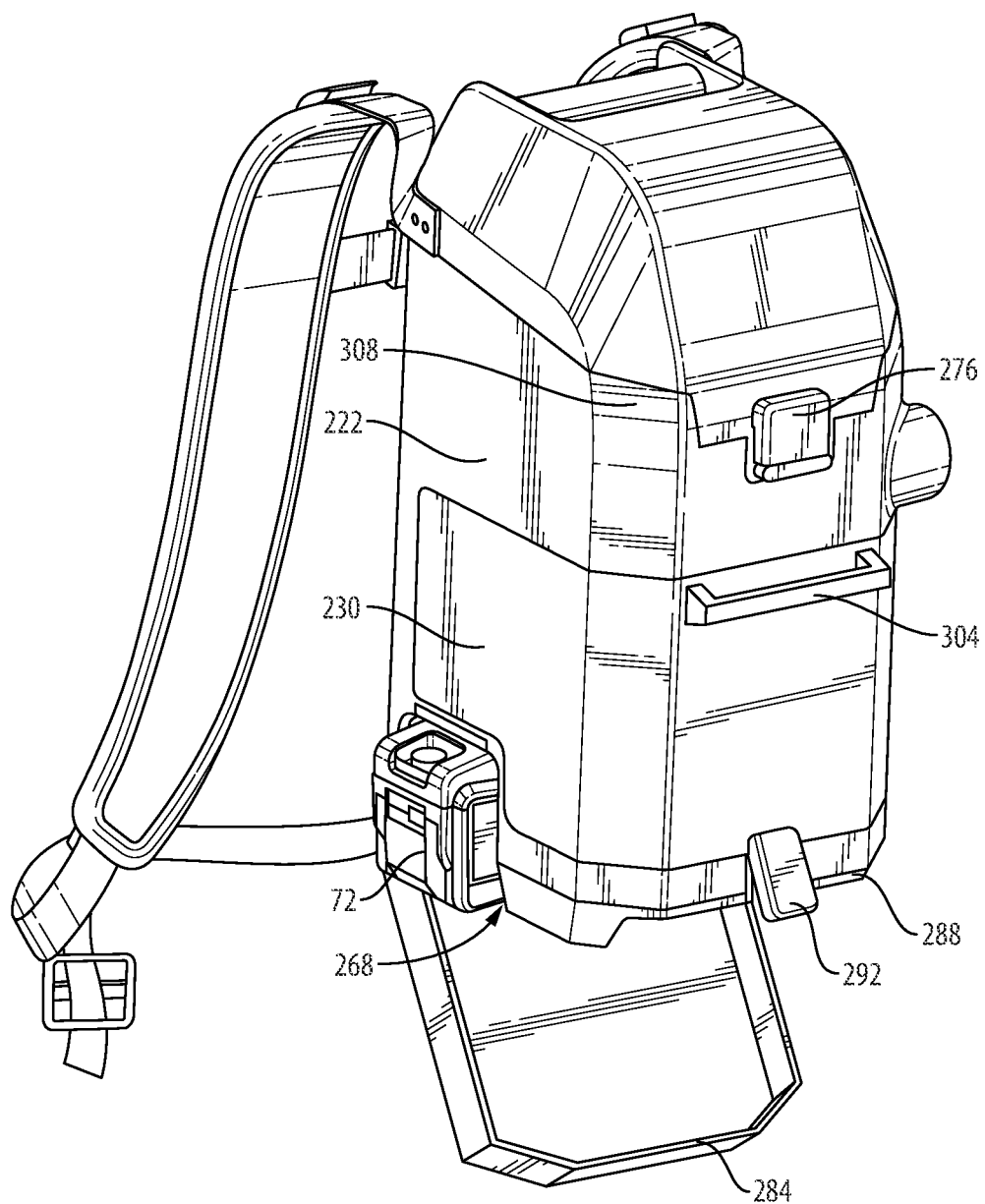
FIG. 7 is another perspective view of the wearable vacuum cleaner of FIG. 4, illustrating a collection bin lid in an open position.

With brief reference to FIGS. 6 and 7, the suction motor assembly 234 may be disposed in the main housing 222 vertically above the collection bin 230 and the battery receptacle 268. In the illustrated embodiment, the suction motor 238 and impeller 242 are disposed vertically below the top mounted handle 226. In some embodiments, the suction motor assembly 234 is positioned higher in the main housing 222 than the collection bin 230 and the battery receptacle 268, and the suction motor 238 and the impeller 242 are positioned lower than the top mounted handle 226. The lid 284 is moveably coupled to the collection bin 230 to selectively cover the opening 296 in a closed position (FIG. 6) and uncover the opening 296 in an open position (FIG. 7). The collection bin 230 may be arranged on the main housing 222 so the lid 284 can be moved to the open position to empty contents of the collection bin 230 (e.g., held in the chamber 300) through the opening 296 while the collection bin 230 remains attached to the main housing 222. In other words, the battery receptacle 268 is offset relative to the lid 284, such that the lid 284 is moveable to the closed position and to the open position without moving the battery receptacle 268 relative to the collection bin 230.

Although aspects have been described in detail with reference to certain embodiments, variations and modifications exist within the scope of one or more independent aspects as described. Various features of the present invention are set forth in the following claims.

What is claimed is:

1. A wearable vacuum cleaner comprising:
a harness configured to support the wearable vacuum cleaner on a user's back;
a housing connected to the harness, the housing defining a working airflow path from a dirty air inlet and an exhaust outlet;
a suction motor assembly disposed within the housing and operable to create a working airflow through the working airflow path; and
a collection bin disposed within the working airflow path and configured to receive debris separated from the working airflow, the collection bin including:
a top portion and a bottom portion opposite the top portion, the top portion located above the bottom portion when the collection bin is in an upright and vertical orientation,
an opening adjacent the bottom portion of the collection bin, and
a lid moveably coupled to the collection bin to selectively cover the opening in a closed position and uncover the opening in an open position,
wherein the lid is movable to the open position to empty contents of the collection bin through the opening while the collection bin remains attached to the housing.

2. The wearable vacuum cleaner of claim 1, further comprising a battery receptacle supported by the housing, the battery receptacle configured to receive a rechargeable battery for powering the suction motor assembly.

3. The wearable vacuum cleaner of claim 2, wherein the battery receptacle is offset relative to the lid, such that the lid is moveable to the closed position and to the open position without moving the battery receptacle relative to the collection bin.

4. The wearable vacuum cleaner of claim 3, wherein the battery receptacle is disposed above the collection bin and above the suction motor assembly.

5. The wearable vacuum cleaner of claim 3, wherein the battery receptacle is disposed below at least a portion of the collection bin and below the suction motor assembly.

6. The wearable vacuum cleaner of claim 5, wherein the battery receptacle is disposed nearer than the lid to the user's back while the wearable vacuum cleaner is being worn by the user.

7. The wearable vacuum cleaner of claim 1, wherein the collection bin includes a bagless dirt cup.

8. The wearable vacuum cleaner of claim 1, wherein the collection bin includes a cyclonic separator.

9. The wearable vacuum cleaner of claim 2, further comprising a handle coupled to the housing, the handle being disposed above the collection bin and above the battery receptacle.

10. A wearable vacuum cleaner comprising:
a harness configured to support the wearable vacuum cleaner on a user's back;
a housing connected to the harness, the housing defining an upper portion, a lower portion, and a working airflow path from a dirty air inlet and an exhaust outlet;
a suction motor assembly operable to create a working airflow through the working airflow path;
a carrying handle coupled to the upper portion of the housing;
a battery receptacle supported by the housing, the battery receptacle configured to receive a rechargeable battery for powering the suction motor assembly; and
a collection bin disposed within the working airflow path and configured to receive debris separated from the working airflow, the collection bin including:
an opening adjacent a bottom portion of the collection bin, and
a lid moveably coupled to the collection bin to selectively cover the opening in a closed position and uncover the opening in an open position,
wherein the battery receptacle is not positioned vertically below the lid when the collection bin is coupled to the housing, and
wherein the lid is positioned vertically below the suction motor assembly and the carrying handle when the collection bin is coupled to the housing and the collection bin is in an upright and vertical orientation.

11. The wearable vacuum cleaner of claim 10, wherein the collection bin is removably coupled to the housing, and wherein the collection bin is removable from the housing principally along a first forward direction.

12. The wearable vacuum cleaner of claim 11, wherein the battery receptacle is configured to receive the rechargeable battery inserted along a direction orthogonal to the first forward direction.

13. The wearable vacuum cleaner of claim 11, wherein the battery receptacle is configured to receive the rechargeable battery inserted along a direction transverse to the first forward direction.

14. The wearable vacuum cleaner of claim 10, wherein the battery receptacle is supported by the housing and not the collection bin, such that the collection bin can be emptied without:
moving the battery receptacle relative to the collection bin, or
removing the collection bin from the housing.

15. The wearable vacuum cleaner of claim 10, wherein the collection bin includes a bagless dirt cup.

16. The wearable vacuum cleaner of claim 10, wherein the collection bin includes a cyclonic separator.

17. A wearable vacuum cleaner comprising:
- a harness configured to support the wearable vacuum cleaner on a user's back;
- a housing connected to the harness;
- a suction motor assembly operable to generate a working airflow;
- a collection bin removably coupled to the housing and including
  - a cyclone arrangement configured to separate debris from the working airflow,
  - a chamber configured to receive the debris separated from the working airflow, and
  - a lid adjacent a bottom portion of the housing, the lid being moveable to selectively open and close the chamber, the chamber being configured to be emptied while opened and while the collection bin is coupled to the housing, and the chamber being configured to be emptied while opened and while the collection bin is removed from the housing;
- a first latch operably connected to the collection bin and configured to secure the collection bin to the housing;
- a second latch operably connected to the lid and configured to retain the lid in a closed position, in which the chamber is closed, the first latch and the second latch each being accessible by the user while the wearable vacuum cleaner is worn on the user's back and the collection bin is coupled to the housing; and
- a battery receptacle configured to receive a rechargeable battery.

18. The wearable vacuum cleaner of claim 17, wherein the battery receptacle is supported by the housing independently of the collection bin, such that operation of the first latch, the second latch, or both the first latch and the second latch does not alter a position of the battery receptacle relative to the housing.

19. The wearable vacuum cleaner of claim 18, wherein the battery receptacle is not positioned vertically below the lid when the collection bin is coupled to the housing.

20. The wearable vacuum cleaner of claim 19, wherein the battery receptacle is positioned vertically above the collection bin when the collection bin is coupled to the housing.

* * * * *